Dec. 21, 1937.  J. GYURIS  2,102,701
ELECTRIC CURRENT PRODUCING UNIT OR CELL
Filed Nov. 18, 1933   2 Sheets-Sheet 1
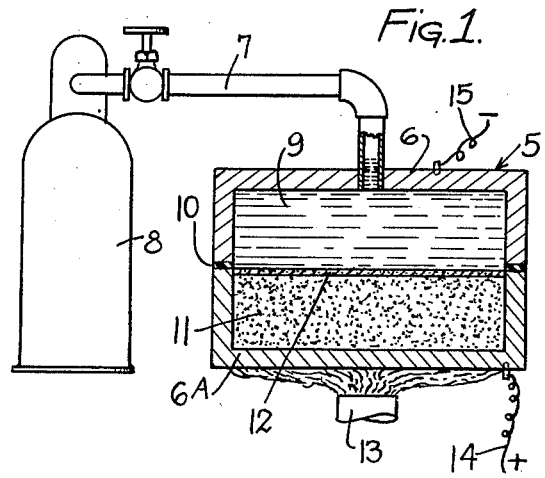
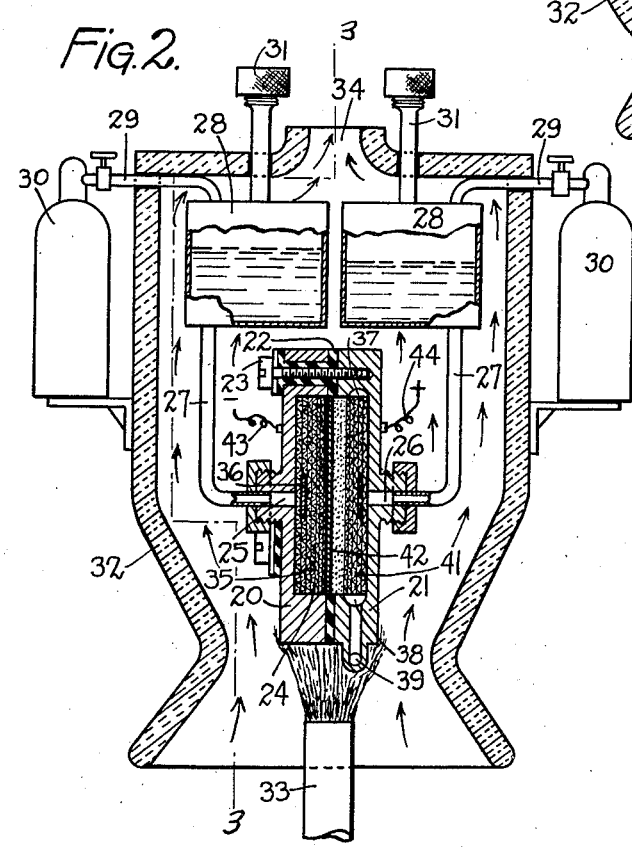
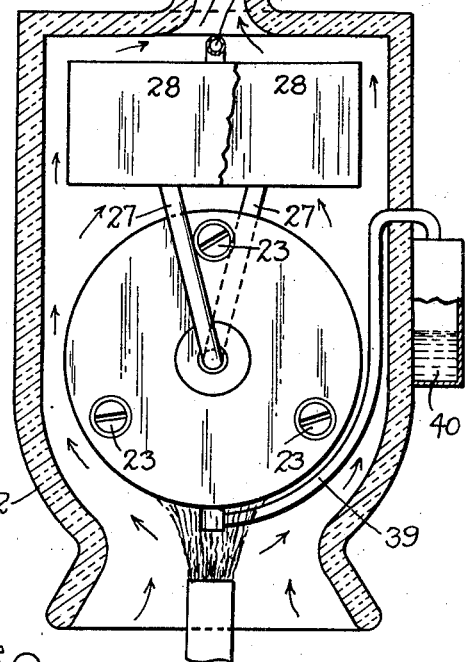
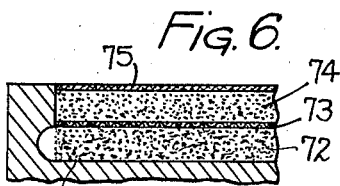
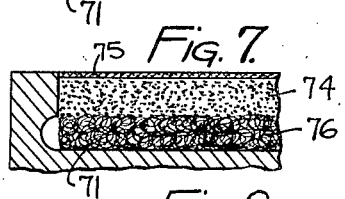
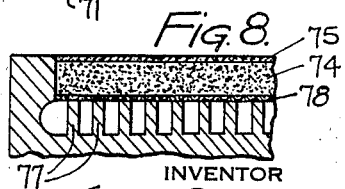
INVENTOR
JANOS GYURIS
BY John J. Lynch
ATTORNEY Dec. 21, 1937.   J. GYURIS   2,102,701
ELECTRIC CURRENT PRODUCING UNIT OR CELL
Filed Nov. 18, 1933   2 Sheets-Sheet 2
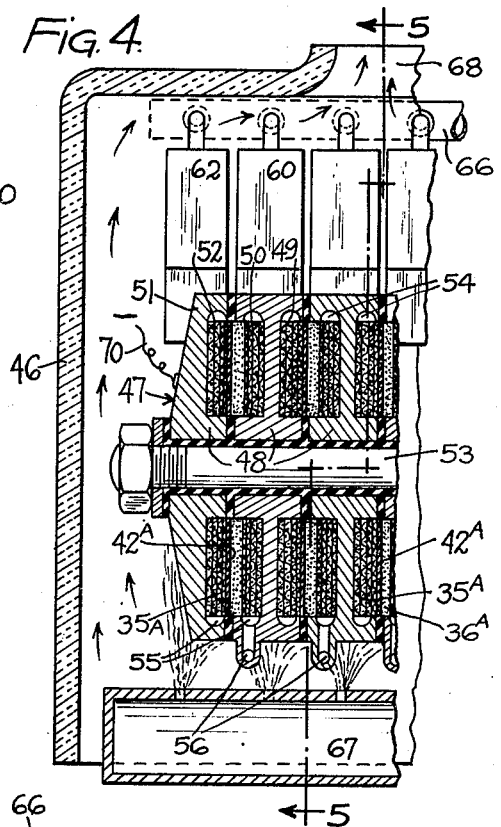
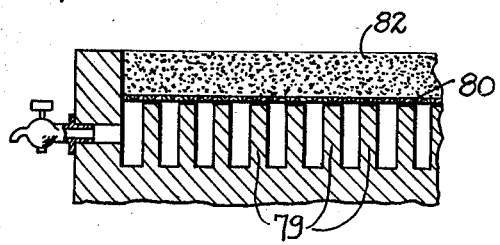
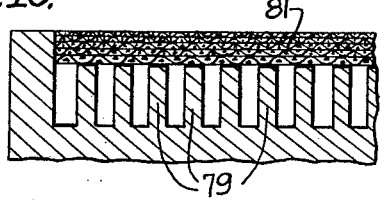
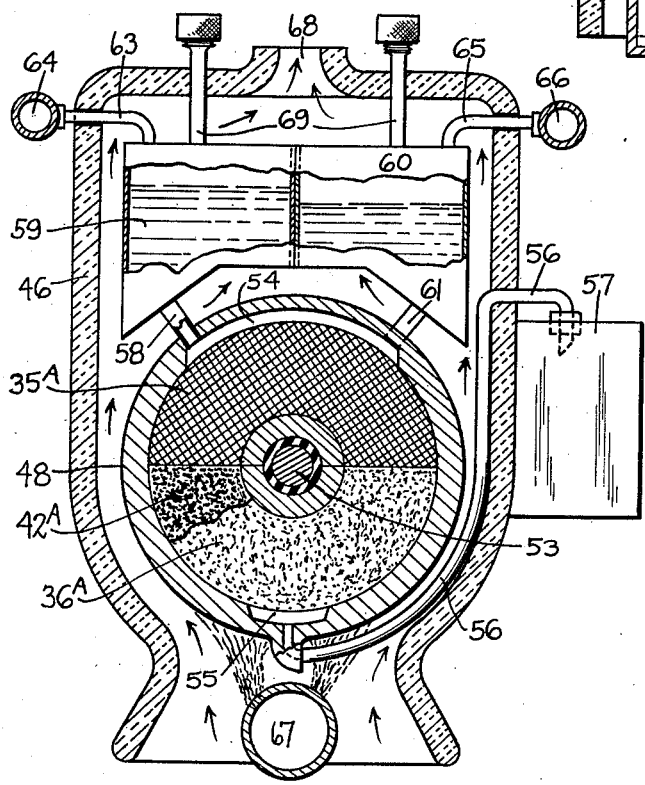
INVENTOR
JANOS GYURIS
BY
ATTORNEY Patented Dec. 21, 1937

2,102,701

UNITED STATES PATENT OFFICE 2,102,701

ELECTRIC CURRENT PRODUCING UNIT OR CELL

Janos Gyuris, New York, N. Y.

Application November 18, 1933, Serial No. 698,607
In Hungary July 17, 1933

6 Claims. (Cl. 136—83)

This invention relates to electric current producing units or cells and in particular to one which is self contained and which, through the medium of externally applied heat, generates electricity.

A particular object of my invention is to provide a primary element of the nature referred to which functions at an even output and which can be arranged with means whereby the cathode as well as the regenerating material may be supplemented and replenished during the operation of the element or life thereof.

A further object is to provide a unit which has an extended period of action over the form of my invention illustrated in application Serial No. 686,469 filed Aug. 23, 1933, and one which will at all times produce a uniform degree and strength of current output. Also, my improvement contemplates the use of a single self-contained unit or one in which is incorporated a number of operating cells in series to produce a unit of larger capacity, means being also provided both in the single cell unit and in the multi-cell member for replenishment of the materials therein.

Changes and variations in the construction shown and described, may be made without departing from the principles of the invention or sacrificing its chief advantages; and for the purposes of illustration, several preferred embodiments of my invention are shown in the accompanying drawings, in which;

Figure 1 is a view in elevation, parts thereof being shown in section, of an electric current producing unit in which pressure is employed to raise the output of said unit.

Figure 2 is a view in sectional elevation of a current producing unit in which means are illustrated for replenishing the generating material and draining off the residue.

Figure 3 is a section taken on the line 3—3 of Figure 2, and illustrates the position of the cell in respect to a casing and also the reservoir for catching the residue.

Figure 4 is a view in sectional elevation of a modified form of device in which is incorporated a plurality of cells or units arranged in series, and Figure 5 is a view in section taken on the line 5—5 of Figure 4 and illustrates the relative positions of the replenishing means.

Figures 6, 7, and 8 is a fragmentary view in section showing modified forms of the anode member.

Figures 9 and 10 are views similar to Figs. 6, 7, and 8 showing the construction of the modified forms of the cathode.

Referring to the drawings in detail, and in particular to Figure 1, 5 indicates a metallic casing which for convenience may be made in two parts, the upper 6 having a pipe 7 leading thereto which supplies gas pressure from a tank 8 or other source to sodium (Na) 9 which fills the upper part of the casing 5 and is in liquid state when under the influence of sufficient heat. The upper 6 and lower 6A parts of the casing are suitably insulated as at 10 from each other, and the lower part contains manganese dioxide 11 ($MnO_2$), which is separated from the sodium by the filter sheet 12. The function of this sheet is to permit the proper rate of infusion of the sodium with the manganese, the sheet 12 being made from cement or other suitable porous material that will be hereinafter set forth.

In accordance with my invention as disclosed in the application referred to, the manganese is compressed a suitable degree. The gas in the tank 8 exerts a pressure on the sodium 9 and I have found that this pressure of the gas on the sodium results in an increase in the current output of the unit. Any gas that does not unite with sodium under pressure may be employed as well as air or the sodium itself may be introduced under pressure. The unit in operation is heated to a suitable degree, preferably in excess of the melting point of the sodium and within a range of 300 to 450 degrees centigrade. The source of heat is indicated as at 13 and current conductors 14 and 15 are secured to the casing parts to lead off the generated current.

In the form of my invention illustrated in Figures 2 and 3, means are employed for supplying the unit so that the life thereof is extended. The unit in this instance consists of the casing members 20 and 21 suitably insulated from each other as at 22 and secured together by the screws 23, which are also insulated. The members 20 and 21 are preferably made of iron and are recessed to provide, when the members are assembled, an interior chamber which holds the current producing elements. This chamber 24 has the oppositely positioned outlets 25 and 26 in members 20 and 21 respectively. Each outlet is connected with a pipe 27 to a tank 28, which in turn is connected by a pipe 29 to a source of gas pressure 30. Each tank is also provided with an inlet 31 through which the contents of the tank may be replenished as desired. The equipment described with the exception of the gas pressure supply means 30 is housed in a heat proof jacket 32 which is open at the bottom to admit the source of heat 33. The jacket 32 may be made of asbests or other suitable material, and have a central flue opening 34 in the top thereof.

The tank 28 that supplies the unit inlet 25 contains sodium which, when heated, is in a liquid state and feeds into the unit under the influence of the gas pressure admitted to the tank from the parent pressure means 30 which contains hydrogen or any gas which when heated does not unite with sodium. The tank 28 that supplies the inlet 26 of the unit, contains sodium nitrate which is forced into the inlet 26 by the pressure of the gas in the parent pressure means 30 which may be nitrogen or oxygen.

The chamber 24 in the unit contains the generating elements and in manufacture, the part 20 of the unit is packed with a series of metal screens 35 and constitutes the cathode. These screens 35 are arranged with the heavy or coarse one nearest the inlet 25 and the finest one exactly flush with the open side of said member 20. These screens may be compressed and function as a filtering and diffusing agent to scatter the sodium evenly over the surface of the finest one. A spreading plate 36 is employed adjacent the mouth of the inlet 25 to prevent the sodium from taking a direct course through the diffusing screens 35.

The opposite member 21 is formed with an upper and a lower groove 37 and 38 respectively, the lower of which is connected by a pipe 39 with a drain tank 40. The member 21 is packed with the metal screens 41 graduated in density or coarseness from coarse, adjacent the inlet 26 to fine at a point slightly beyond the edge of the grooves 37 and 38. Beyond the finest screen and in close contact therewith, the member is packed with a mixture of manganese and sodium nitrate or with manganese alone to a point adjacent the open side of the member 21. Next to the manganese there is provided a sheet 42 of material compressed from 500 to 1500 kilograms per square centimeter pressure and preferably made from a substance such as cement, boracite, chalk (calcium carbonate) kaolin ($H_4Al_2Si_2O_9$), fire clay, corundum, zirconium oxide or calcium oxide. The material of the sheet should be such that it resists the chemical action of sodium but permits its passage or seepage into the manganese or anode side of the unit.

In the operation of the unit, the contact of the sodium with the manganese generates an electric current. It is noted that electrons travel from the sodium to the manganese, as does the current and during the action of the unit the current is led off through the conductors 43 and 44. In this form of my invention, generally, the sodium in contacting with the manganese relieves the latter of oxygen and the manganese replenishes its oxygen from the sodium nitrate which is introduced under pressure. Instead of sodium nitrate, I may employ steam, vapor or any oxygen bearing agent such as acid, that will release oxygen when in contact with manganese or sodium. In the use of these pressure elements, the same pressures must be employed at opposite sides of the unit. Also, the cement sheet may be impregnated with sodium oxide which is formed between the sodium and the manganese when the unit is heated and makes a good conductor.

The manganese can be mixed with any of the materials from which the sheet 42 may be made as above set forth, manganese peroxide however being preferable and the manganese can have mixed with it metal filings or other oxygen releasing media which tends to steady the current output flow. Direct contact of the sodium and manganese must be avoided because too violent an action will result, this action being controlled by the thickness of the sheet 42.

The cement sheet 42 may have embedded therein, a metallic element in powder or other like form which will act as a good electrical conductor and yet prevent a too violent action between the sodium and the manganese.

For the regeneration of the anode or material in part 21 of the unit, it is advantageous to use material similar to sodium nitrate because no gases causing disturbance are freed from them even when they give up a certain portion of the oxygen they contain, as for example when sodium nitrate is reduced to sodium nitrite. Gases may also be employed which cause chemical processes similar to sodium nitrate.

In the form of my invention illustrated in Figures 4 and 5, 46 represents a housing of asbestos or other heat proof material in which is disposed a series of units 47 made up of a plurality of members 48 having recesses 49 and 50 in the opposite faces thereof, and end pieces 51, only one of which is illustrated, and which is provided with a single recess 52 similar to the recesses 50 referred to. All of the members 48 and 51 are insulated from each other and are held together by the central bolt 53 which is also insulated from the members. Each of the recesses are provided with an upper and a lower groove 54 and 55 respectively, and from the lower groove in the recesses 49 extend the pipes 56 which drain the recesses into a residue tank 57 common to all of the pipes 56. This tank is located outside the housing 46. In all but the end members 51 the recesses 49 are connected through the pipes 58 with the sodium compartment 59 of a tank, one being provided for each member or unit 47, and said tank having a central partition which divides the tank to provide the sodium nitrate compartment 60, which is connected with the recess 50 through the pipe 61. The recess 52 is supplied through a suitable pipe similar to pipe 58 from a single sodium tank 62, while the end member 51, not shown, is supplied from a single tank containing sodium nitrate. The sodium tank and compartments are supplied with hydrogen or other gas through the pipes 63 which lead from the common supply pipe 64 outside the housing 46. The sodium nitrate tank and compartments are supplied with nitrogen or oxygen or other gas through pipes 65 which lead from the common supply pipe 66.

All of the units or members are heated from the single burner 67 disposed in the bottom of the housing 46 which is open to provide a circulation of air through the housing which is vented through a flue in the top thereof as at 68. Each tank compartment has a supply pipe 69 extending to the exterior of the housing, through which the compartment may be supplied at will. All of the pipes and compartment tanks are suitably insulated from each other so that shorting of the current generated by the unit is eliminated. In Figure 4, the member 51 represents the cathode and the opposite end piece, not shown, represents the anode and each has leading therefrom a wire or conductor 70 to convey the current generated.

The assembly of the units forms chambers similar to the chambers 24 of Figure 2 and the elements employed are the same as those mentioned in connection with the form of invention illustrated in Figure 2. The recesses 49 are the anodes and the recesses 50 are the cathodes and in Figures 6, 7, and 8 an alternate construction of the anodes is shown while in Figures 9 and 10 the alternate constructions of the cathode are illustrated.

In Figure 6, the anode recess 71 is packed in the bottom with metal grains such as iron filings 72 on top of which is placed a metallic screen or filter 73. On top of this is placed manganese oxide 74 and the filling is completed by a pressed sheet 75 of cement which is flush with the outer surface of the recessed member.

In Figure 7, the bottom of the recess is packed with a metallic element in wool form 76, the recess then being filled as described in connection with Figure 6.

In Figure 8, the bottom of the recess in manufacture is provided with ribs 77, on top of which is laid the metallic screen 78, the recess being thereafter filled with the manganese dioxide and cemnt sheet, as in Figures 6 and 7.

In Figures 9 and 10, the cathode recess is provided with cast ribs 79, and in Figure 9, a screen or metal filter 80 is laid on the ribs and thereover metal filings, grains or chips or carbon particles to fill the recess level with the top edge of the unit. In Figure 10, a plurality of metallic screens 81 are laid and pressed on the ribs, the coarsest screen next the ribs and finest mesh or sieve on top flush with the top of the unit.

I have found that excellent results can be obtained by combining alkali materials or metals, alloys and mixtures with elements belonging to the oxygen group or materials containing the same, for example; sodium metal as cathode and manganese dioxide plus 20% sodium nitrate as anode, the temperature applied ranging from 250 to 450 degrees centigrade. I have also found that an anode consisting of compressed manganese dioxide plus 20% sodium nitrate can be substantially thinner which is important in the reduction of the inner ohmic resistance. For good contact and steady production it is important that the sieves or filters used fit closely with each other and tightly into the recesses of the units. Also these sieves prevent a too sudden chemical reaction and because of their heat conducting properties they adjust possible local overheating.

As the material containing and liberating oxygen circulates continuously, thus supplying the element with fresh material, such arrangement has also the advantage that it is not dependent on the use of sodium oxide. I have found that any suitable porous material made under suitable pressure, thickness and porosity may be used if it can stand the action of the melted alkali metal and is not a good electrical conductor. In the present instance, the actual anode is the regenerating fluid itself and the layers of sodium oxide or cement act only as a brake or filter. Materials which will resist well the action of melted sodium are boracite and those listed in the preceding description of sheet 42. I may advantageously mix into the materials composing the layers made of either sodium oxide or those materials from which the sheet 42 may be made, catalytic agents in small or large proportion. For instance, vanadium pentoxide ($V_2O_5$) added in a quantity of 0.5% noticeably increases the resistance and the intensity of the current.

The activity of liquefied regenerating materials can be increased if there is mixed with them such compounds of, for instance, chromium and vanadium, which added in smaller or larger proportion, melt in them when heated. Thus, to lithium nitrates, sodium, potassium and lithium chlorates can be advantageously added chromium trioxide, sodium and potassium dichromate ($K_2Cr_2O_7$) vanadium pentoxide, etc.

As a regenerating material I can also use air with the humidity it contains, this humidity assisting the formation of NaOH and its outflow. Pure oxygen can be used only with an additional amount of steam or vapor because with the use of pure oxygen the $Na_2O$ would solidify, insulating the sodium. This could be avoided only by heating the element to a temperature high enough to melt the $Na_2O$, which is about 600 degrees centigrade. Whether use is made of humidified oxygen or other suitable gas, it is necessary that they be heated to an appropriate temperature for functioning. From the foregoing disclosure, it it obvious that by regulating the pressure and temperature employed, the current output is controlled.

In Figures 4 and 5, numerals 42A refer to the cement sheet, 35A to the metallic filter screens and 36A to the manganese dioxide. In Figure 9, the numeral 82 represents the metal chips or filings.

The materials mentioned as alternates for the cement in sheet 42 may be employed alone instead of manganese oxides and if so, no cement sheet is necessary because these materials provide the necessary resistance to violent action in coacting with the sodium. The reason that manganese oxides are better is that they more readily give up some oxygen in addition to taking it away from the sodium with the result that a more steady current is supplied. The elements set forth above have been found to be best, but instead of sodium nitrate, I may employ potassium nitrate or lead nitrate and I may mix with the manganese, potassium bichromate, potassium chlorate, sodium chlorate, lead sulphate, tellurium, selenium or vanadium pentoxide. These elements promote the action of the manganese in releasing oxygen and it has been found that as little as 5% lead sulfate in the manganese will increase the current output.

While I have illustrated several embodiments of my invention, it is evident that the arrangement of the units, their shape and size and capacity will depend upon the particular use to which they are to be put and also, the means of replenishing the anode and cathode materials may be varied without in any way departing from the spirit of the invention.

What I claim is:

1. In a continuously operating current-producing electric element, the combination comprising a cathode and an anode chamber opening into each other, means including a reservoir for feeding a fused alkali metal into said cathode chamber, means including a second reservoir for feeding fused oxygen-releasing substance into said anode chamber, heating means for maintaining both said cathode and anode substances above the temperature of fusion, and diffusing means interposed between said cathode and anode chambers and including a plurality of metal screens for controlling the reaction between said substances.

2. In a continuously operating current-producing electric element the combination comprising a cathode and an anode chamber opening into each other, means including a reservoir under pressure for continuously feeding fused sodium metal into said cathode chamber, means including a second reservoir under pressure for feeding fused sodium nitrate into said anode chamber, heating means for maintaining said sodium and said sodium nitrate above the temperature of fusion, and diffusing means including a plurality of metal screens and a layer of manganese interposed between said cathode and anode chambers for controlling the reaction between said sodium and said sodium nitrate.

3. In a continuously operating current-producing electric element, the combination comprising a plurality of cathode chambers, an anode chamber for each of said cathode chambers and opening thereinto, an insulated reservoir for each of said cathode chambers and adapted to feed fused sodium metal thereinto, an insulated reservoir for each of said anode chambers and adapted to feed fused sodium nitrate thereinto, heating means for maintaining both said sodium and said sodium nitrate above the temperature of fusion, diffusing means including a plurality of metal screens and a layer of manganese interposed between each cathode and anode chamber for controlling the reaction between said sodium and said sodium nitrate, and electric conduit means for collectively withdrawing electrical energy generated in said chambers.

4. In a continuously operating current-producing electric element, the combination comprising a plurality of recessed members having cathode and anode chambers formed therein, said members being so constructed and arranged as to have each cathode chamber opening into an anode chamber, an insulated reservoir for each of said chambers and adapted to feed fused sodium metal and fused sodium nitrate into said cathode and anode chambers respectively, heating means for maintaining both said sodium and said sodium nitrate above the temperature of fusion, diffusing means including a plurality of metal screens and a layer of manganese interposed between each of said cathode and anode chambers to control the reaction between said fused sodium and sodium nitrate, and conduit means electrically associated with said chambers for collectively withdrawing electrical energy generated therein.

5. In a continuously operating current producing electric element, the combination comprising a plurality of disk-like metallic members having a recess in both of their sides, said members being insulatedly juxtaposed to have the recesses of adjoining members in registering position and forming cathode and anode chambers opening into each other, an insulated reservoir for each of said chambers and adapted to feed fused sodium metal and fused sodium nitrate into said cathode and anode chambers respectively, heating means for maintaining both said sodium and said sodium nitrate above the temperature of fusion, diffusing means including a plurality of metal screens and a layer of manganese interposed between each of said cathode and anode chambers to control the reaction between said fused sodium and sodium nitrate, and conduit means electrically associated with said metal members for collectively withdrawing electrical energy generated by said reaction in said chambers.

6. In a continuously operating current-producing electric element, the combination comprising a plurality of juxtaposed disk-like metallic members having an annular recess in both of their sides and a hole through the center thereof, insulating and packing means interposed between the circumferential portions of said members, a duct in said members for each of said recesses, an insulated bolt member inserted through said holes and maintaining said members and the recesses therein in registering position to form cathode and anode chambers opening into each other, an insulated reservoir for each of said chambers and adapted to feed fused sodium metal and fused sodium nitrate through said ducts into said cathode and anode chambers respectively, heating means for maintaining both said sodium and said sodium nitrate above the temperature of fusion, diffusing means including a plurality of metal screens of different fineness and a layer of manganese interposed between each of said cathode and anode chambers to control the reaction between said fused sodium and sodium nitrate, and conduit means electrically associated with said disk-like members for collectively withdrawing electrical energy generated by said reaction in said chambers.

JANOS GYURIS.